Nov. 27, 1934.  R. EHRENFELD  1,982,339
SWITCH
Filed Sept. 6, 1933  2 Sheets-Sheet 1

WITNESSES:  INVENTOR
*Ralph Ehrenfeld.*
BY
ATTORNEY

Nov. 27, 1934.    R. EHRENFELD    1,982,339
SWITCH
Filed Sept. 6, 1933    2 Sheets-Sheet 2
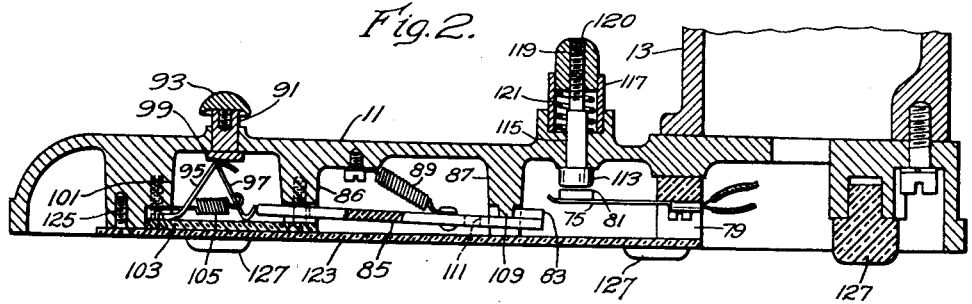
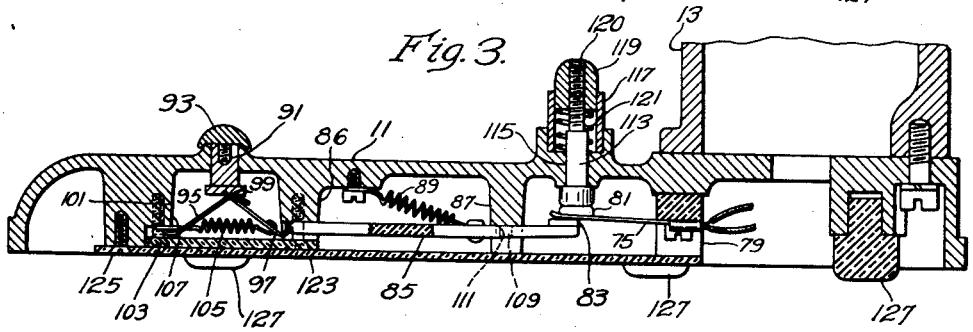
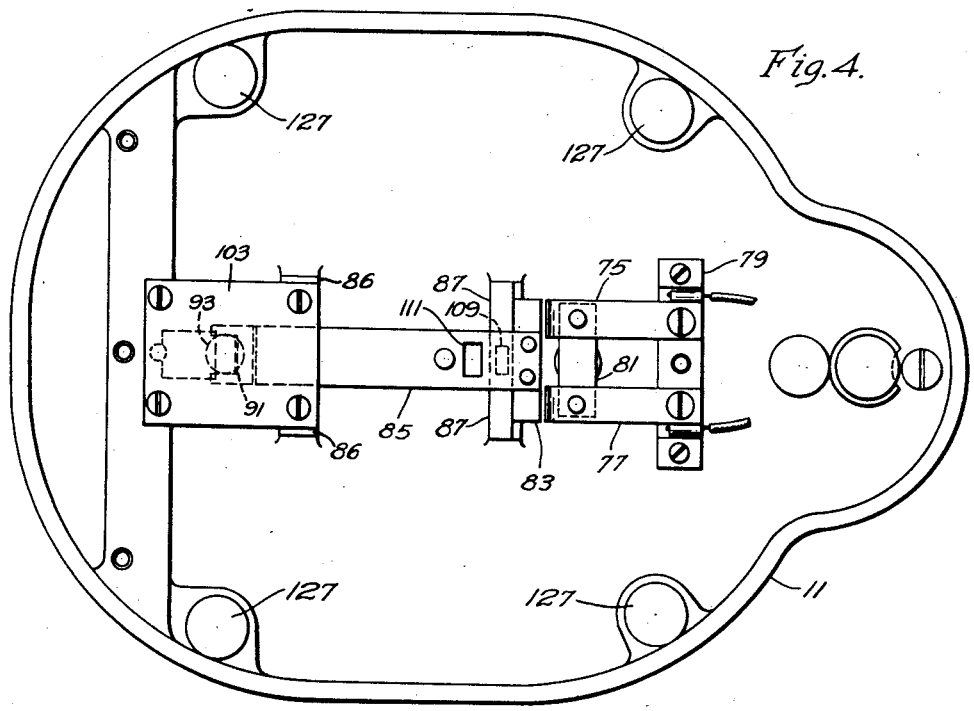
INVENTOR
Ralph Ehrenfeld.

Patented Nov. 27, 1934

1,982,339

UNITED STATES PATENT OFFICE 1,982,339

SWITCH

Ralph Ehrenfeld, Springfield, Mass., assignor to Westinghouse Electric & Manufacturing Company, East Pittsburgh, Pa., a corporation of Pennsylvania Application September 6, 1933, Serial No. 688,317

11 Claims. (Cl. 200—47)

My invention relates to motor-driven appliances and particularly to switches for the control of the motors of such appliances.

An object of my invention is to provide a relatively simple, efficient and snap-acting control switch that shall occupy a minimum amount of space.

Another object of my invention is to provide a switch which is manually actuable to a circuit-closing position and which is actuable to a circuit-opening position by means moved by the motor.

Another object of my invention is to provide a motor-circuit-controlling switch in which one part thereof is manually movable to effect closing of the circuit and in which another part of the switch is moved to effect opening of the circuit.

Another object of my invention is to provide a motor control switch in a motor-driven appliance including an element moved by the motor in a cyclic path that shall be manually actuable to circuit-closing position and that shall be moved to circuit-opening position by the element at the end of its first cycle of travel.

In practicing my invention I provide a motor-driven appliance including an element which is movable in a cyclic path, which path may be either in a vertical or in a horizontal direction, the switch particularly embodying my invention including cooperating fixed and movable contact members, means for normally biasing the movable contact member to the open position, manual means for moving the movable contact member and its support to circuit-closing position, resilient latching means to hold the contact members in engagement and means actuated by the movable element or member at the end of its first complete cycle of travel to cause opening of the switch.

In the accompanying drawings:

Fig. 2 is an enlarged fragmentary vertical sectional view through the base of the motor-driven appliance in which the switch is located, the switch being shown in its open position;

Fig. 3 is a view similar to that of Fig. 2 but with the switch shown in its closed position; and Fig. 4 is a bottom plan view of the base and switch, the bottom cover thereof being removed.

Figure 1:
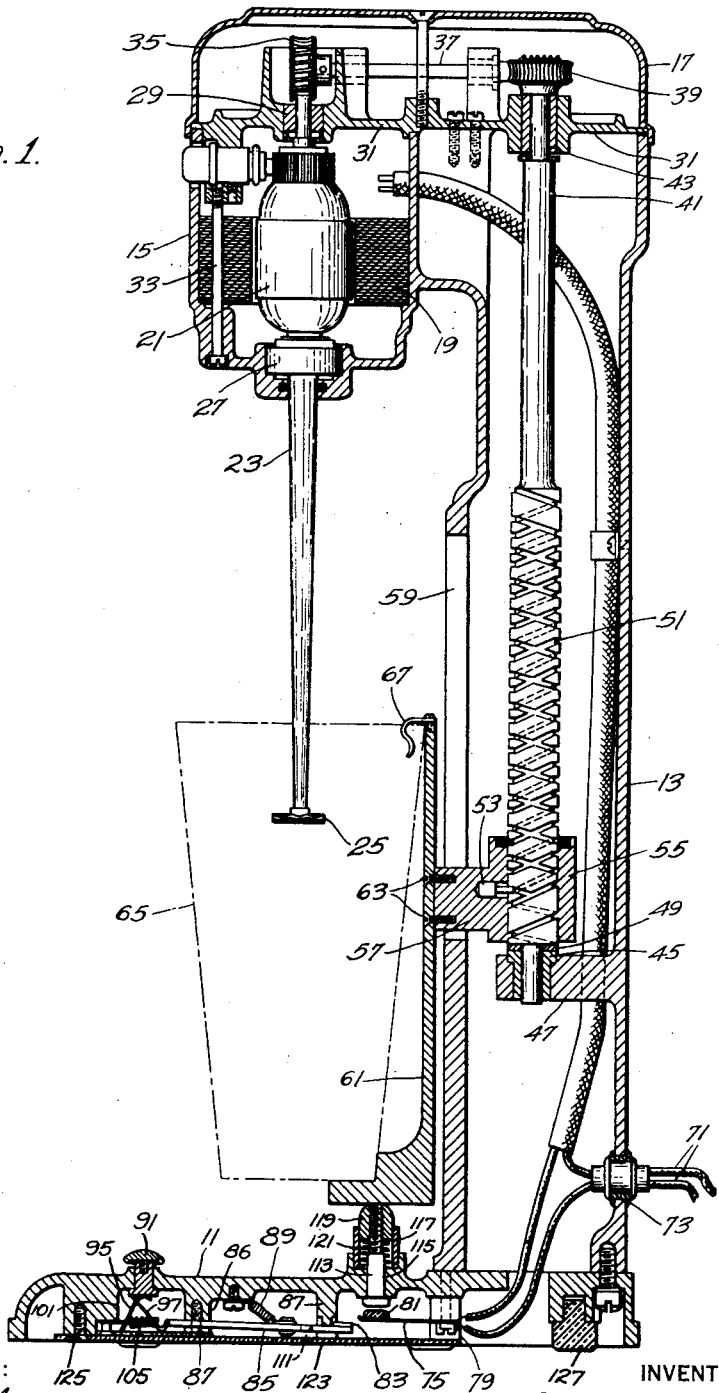
Figure 1 is a view in vertical section through a motor-driven appliance utilizing a switch particularly embodying my invention.

The switch particularly embodying my invention has been developed in connection with what is usually termed a drink mixer and I have, therefore, illustrated and described its construction and operation in connection with such a device, although it is to be understood that its use is not limited to this particular appliance.

The appliance shown includes a substantially flat hollow base 11 open at the bottom, a standard 13 extending vertically upwardly therefrom and having a lateral extension or casing 15 at the upper end thereof, as well as a cover member 17.

The casing portion 15 has located therein a motor structure comprising a stator 19 of which only the laminations are shown, it being understood that suitable energizing windings (not shown) are utilized, and a rotor structure 21 including a downwardly extending rotor shaft 23 at the lower end of which is mounted a suitable mixing element 25 of the kind usually employed with high-speed shafts to mix liquids. A bearing 27 is provided in the lower end of the casing 15 and an upper bearing 29 is located in an intermediate plate 31 located in the upper portion of casing 15, a plurality of vertically-extending machine screws 33 being used to hold the plate 31 in its proper operative position.

A speed-reducing transmission mechanism is located in the space between the cover 17 and the plate 31 and may include a worm and worm gear directly associated with the upper end of rotor shaft 23, which mechanism is designated by the numeral 35, this driving an intermediate shaft 37 at reduced speed, there being a second worm and worm gear mechanism provided at the other end of shaft 37 which mechanism is indicated generally by numeral 39. The object of these two speed-reducing mechanisms is to drive a vertically-extending shaft 41 at a relatively very slow speed. The upper end of shaft 41 may be reduced and be guided in a sleeve bearing 43 while the lower end thereof may be supported and guided in a step bearing 45 which is supported in a lug 47 provided on the inside of the hollow standard 13. A wearing plate 49 may be provided for the lower end of shaft 41.

As it is desired to have the rotor 21 cause a cyclic movement of one part of the entire assembly, a part of shaft 41, particularly the lower portion thereof, is provided with a helical groove 51 which is endless and is of such design that a pin 53 extending into the groove will be moved upwardly a predetermined distance and then downwardly to the initial position thereof which may, of course, be the lowermost position of this cyclic movement.

A tubular member 55 surrounds a part of the grooved portion of shaft 41 which, as may be seen from Fig. 1 of the drawings, is made of somewhat larger diameter than the other portions of the shaft and member 57 is provided with an integral extension 57 which projects outwardly through a slot 59 in a portion of the hollow standard 13. A supporting member 61, which is of substantially L-shape, is secured to the extension 57 as by screws 63 and a liquid-containing cup 65 may rest thereon, its bottom portion engaging the horizontal extending portion of member 61 while the upper end thereof is held by a hook member 67 secured to the upper end of member 61.

It is obvious that when the motor is energized and caused to rotate in one direction only, the rotation of shaft 41 will cause movement of member 55 first in an upward direction at a very low speed of travel, and then in a downward direction, this cycle being, of course, repeated if no means is provided for deenergizing the motor at the end of its cycle of travel. The object of this movement is to move the container 65 first in an upward direction and then in a downward direction, so that substantially the major portion of the fluid contents therein will be subjected directly to the mixing action of member 25 to thereby effect a more thorough stirring of the fluid.

It is to be noted further that the details described up to now form no part of my invention, which invention in the form of a suitable control switch is now to be described. Suitable supply circuit conductors indicated generally by numeral 71 extend into the hollow standard 13 through an electric-insulating bushing 73, connections being made to the energizing circuit of the motor which, as shown in Fig. 1 of the drawings, may well be what is called a universal type of motor, which motor is adapted for operation on either a direct-current or on an alternating-current circuit.

My motor-circuit-controlling switch includes a pair of substantially horizontally extending resilient contact arms 75 and 77, one end of each arm being fixedly mounted on a bar of electric-insulating material 79, which bar is suitably secured to the under-surface of base 11. The free or movable ends of the bars 75 and 77 may be connected by a bar 81 of electric-insulating material.

A contact bridging member 83 adapted to be moved into and out of engagement with the movable ends of contact arms 75 and 77 is supported at one end of a substantially horizontally-extending and horizontally-movable bar 85 of electric-insulating material. This bar is prevented from appreciable lateral movement by spaced pairs of depending lugs 86 and 87, and is yieldingly held in one position by a biasing spring 89 which extends angularly away from the bar 85, one end of the spring being secured to the bar 85 and the other end thereof being secured to the bottom surface of base 11.

The contact bridging member and the bar 85 are adapted to be moved in a substantially horizontal direction by manual means including a push-button structure 91 having a portion extending through the base 11 and guided therein in a manner well known in the art, the structure 91 including an actuating knob 93. The lower end of the push-button structure 91 is adapted to engage a toggle including arms 95 and 97 having pivotal engagement with each other at the point 99 as shown in Figs. 1, 2 and 3, the other end of arm 95 being pivotally held against a depending portion 101 of the base 11 by a plate 103 of electric-insulating material. The other end of arm 97 is adapted to engage one end of bar 85, a small spring 105 tending to move the toggle to the position shown in Fig. 2 of the drawings, from which position it may be moved to the position shown in Fig. 3 of the drawings by a downward movement of the push-button structure 91. When the push-button is pressed downwardly the arm 85 is caused to move to the right so that the contact bridging member 83 is in position to engage the free end of contact arms 75 and 77.

A latching means for the horizontally-movable part of the switch includes a depending lug 109 which is adapted to fit into an opening 111 of arm 85 when the arm has been moved sufficiently far to the right so that the lug 109 and the opening 111 may register. The arm 85 is, of course, moved to the right against the tension of spring 89 and it is to be noted here that the contact bridging member 83 will initially be out of engagement with contact arms 75 and 77 until the instant that lug 109 and opening 111 are in register, when the spring 89 will move that end of the arm carrying the contact bridging member in a vertically upward direction with a snap action to cause the bridging member 83 to engage arms 75 and 77 to thereby close the circuit of the motor, causing it to operate.

Means for causing opening of the switch is provided in the form of a vertically movable rod 113 which is guided in an opening 115 in the top of base 11, a tubular member 117 surrounding the upper portion of rod 113 which, at its upper end, is provided with an actuating knob 119, a compression spring 121 being located between the knob 119 and the top of the base to normally yieldingly bias the rod 113 upwardly and out of engagement with the cross-bar 81, these positions being shown particularly in Fig. 2 of the drawings. A headless set screw 120 fits into the same opening in knob 119 as does the upper end of push-rod 113 and may be used to lock rod 113 in any desired position in knob 119.

When member 61 is moved downwardly to the extreme lower limit of its travel, its lower surface will engage knob 119 and move rod 113 downwardly against spring 121. When the rod 113 is moved downwardly, its lower end will engage cross-bar 81 and cause a downward movement of the free end of bars 75 and 77, which downward movement will be communicated to the contact bridging member 83 and to the right-hand end of bar 85 which will, therefore, be moved downwardly to cause unlatching of the latching means including more particularly the lug 109 and the corresponding opening 111 in bar 85. As soon as the upper surface of bar 85 has been moved sufficiently far to be located below the lower end of lug 109, spring 89 will cause movement of bar 85 in the left-hand or reverse direction, causing disengagement of the contact members with a snap action. This disengagement of the cooperating contact members of a motor circuit control switch is effected at a predetermined point in the cyclic path of travel of the movable element and, in the particular case illustrated and described in the present application, this predetermined point is at the bottom of the downward movement after the movable element has moved through one complete cycle of its travel.

A closing plate 123 may be secured to the bottom surface of the base 11, as by one or more machine screws 125, and resilient bumpers 127 may be provided.

The switch assembly constituting my invention is seen to include cooperating contact members both of which are movable or have movable portions, the movement of the respective contact members being, however, in directions angularly related relatively to each other. The contact member that is moved initially to close the circuit is moved manually, while the other contact member is moved automatically by means interposed between it and an element moved in a cyclic path by the motor. The switch element moved manually is moved, in this particular embodiment of my invention, in a substantially horizontal direction and is then moved by a resilient biasing means through a short vertical path when the latching means has become operative, a single biasing means being effective not only to cause return of the initially manually actuable part of the switch when permitted to do so, but also to insure proper operation of the latching means. The contact arms, or more particularly the free ends thereof, are moved downwardly so that the single biasing means associated with the contact bridging member may become operative to unlatch the latching means and to disengage the cooperating contact members with a snap action.

Attention may further be called to the relatively flat hollow base within which the switch structure embodying my invention is located, it being noted that no additional height of the base is necessary to house the switch structure.

While I have illustrated and described a specific embodiment of my invention, it is obvious that my invention is not limited thereto and I desire, therefore, that only such limitations shall be placed thereon as are imposed by the prior art or are set forth in the appended claims.

I claim as my invention:

1. A switch for a motor-driven appliance including a motor and an actuated element moved thereby in a cyclic path, said switch including cooperating contact members, manual means to close the switch by movement of one of said contact members and means to open said switch by initial movement of the other contact member by said actuated element at a predetermined point in the cyclic travel thereof.

2. A switch for a motor-driven appliance including a motor and an actuated element moved thereby in a cyclic path, said switch including resilient contact arms and a movable contact bridging member biased to a disengaged position relatively to the contact arms, manual means to move the bridging member into contact with the contact arms to energize the motor, and means actuated by the movable element at the end of one cycle of its travel to engage the contact arms and cause opening of the switch.

3. A switch for a motor-driven appliance including a motor and an actuated element moved thereby in a cyclic path, said switch including a fixedly mounted resilient contact arm and a movable cooperating contact member biased to a disengaged position relatively to the contact arm, manual means to move the contact member to engaged position to energize the motor, a latching means to hold the switch closed, and means actuated by the movable element at the end of one cycle of travel thereof and operatively engaging the contact arm to move it momentarily to a position to cause release of the latching means and thereby the opening of the switch.

4. A switch for a motor-driven appliance including a motor adapted to operate in one direction of rotation only and an element actuated by the motor to move first in one direction and then in the reverse direction, said switch including cooperating contact members movable in different directions, relatively to each other, manual means for moving one of said contact members in one direction and into engagement with the other, and means actuated by the movable element at the end of its reverse travel to move the other contact in another direction to open the switch.

5. A switch for a motor-driven appliance including a motor adapted to operate in one direction of rotation only and an element actuated by the motor to move first in one direction and then in the reverse direction, said switch including cooperating contact members movable in different directions angularly related to each other, manual means for moving one of said contact members in one direction and into engagement with the other contact member, means for latching it in engaged position, and means engaged and actuated by the movable element at the end of its reverse travel to move the other contact member in an angular direction relatively to the movement of the one contact member to cause release of the latching means and disengagement of the contact members.

6. A switch for a motor-driven appliance including a motor and an element moved thereby in first an upward and then a downward path of travel, said switch including a fixedly mounted contact arm the free end of which is movable vertically only, a contact member normally spring-biased to a position out of engagement with the free end of the contact arm, manual means to move the contact member in a substantially horizontal direction into engagement with the free end of the contact arm, latching means to hold the contact member and the contact arm in engagement, and means normally spring-biased out of engagement with the free end of the contact arm, movable in a vertical direction and engaged by the movable element at its lower limit of travel to move the free end of the contact arm downwardly to cause release of the latching means and disengagement of the contact member and arm.

7. A switch for a motor-driven appliance including a motor and a member moved thereby in a cyclic path, said switch comprising cooperating contact members, manual means operatively engaging one of the contact members to move it to switch closing position and means actuated by the movable member and operatively engaging the other contact member to cause opening of the switch.

8. A switch for a motor-driven appliance including a motor and a member moved thereby in a cyclic path, said switch comprising cooperating contact members, manual means operatively engaging one of the contact members to move it to switch-closing position and means actuated by the movable member and operatively engaging the other contact member to cause opening of the switch when the movable member has moved through substantially one cycle of its travel.

9. A switch for a motor-driven appliance including a motor and a member moved thereby in a cyclic path, said switch including a pair of contact arms, a contact bridging member, a supporting and actuating bar therefor, resilient means normally biasing the bridging member out of engagement with the contact arms, manual means to actuate the bar against the biasing means to cause engagement of the bridging member with the contact arms, a latching means for holding the bar in switch-closing position, said resilient means cooperating with the latching means and effective when the latching means becomes operative to effect engagement of the bridging member with the contact arms with a snap action, and means actuated by the movable member at the end of its first cyclic movement to cause opening of the switch.

10. A switch for a motor-driven appliance including a motor and an actuated member moved thereby in a cyclic path, said switch comprising cooperating contact members, resilient means biasing one contact member out of engagement with the other contact member, latching means operatively engaging the one contact member for holding the contact members in engagement, said resilient means causing engagement of the contact members with a snap action, means actuated by the movable member at the end of its first complete cycle of travel and operatively engaging the other contact member to effect unlatching of the latching means, said resilient means causing separation of the contact members with a snap action.

11. A switch for a motor-driven appliance including a substantially flat hollow base open at the bottom, a motor supported thereon and a member moved by the motor in a vertical cyclic path, said switch including horizontally-extending resilient contact arms having one end of each arm secured to the base, a horizontally movable contact bridging member, a horizontally-extending bar for supporting the bridging member, a spring normally urging the bar to hold the bridging member out of engagement with the contact arms, a push-button at the top of the base to cause horizontal movement of the bar to circuit-closing position, latching means including said spring to hold the bar in circuit-closing position to cause engagement of the bridging member with the contact arms with a snap action, and means extending through the base and engaged by the movable member at the end of its first cycle of travel and moved thereby into momentary engagement with the contact arms to move them to cause unlatching of the latching means and disengagement of the bridging member and the contact arms with a snap action.

RALPH EHRENFELD.